June 13, 1972   R. L. FOWLER   3,669,538
ILLUMINATION SYSTEM
Filed Aug. 31, 1970

INVENTOR
RAYMOND L. FOWLER

BY *Lawrence R. Sutton*

AGENT

United States Patent Office
3,669,538
Patented June 13, 1972

3,669,538
ILLUMINATION SYSTEM
Raymond L. Fowler, Lexington, Ky., assignor to International Business Machines Corporation, Armonk, N.Y.
Filed Aug. 31, 1970, Ser. No. 68,264
Int. Cl. G03b 27/54
U.S. Cl. 355—67
5 Claims

ABSTRACT OF THE DISCLOSURE

A plane mirror illumination system for illuminating a document plane of a document copying machine in such a manner that the light intensity at any point of the document plane varies inversely to the relationship known as the cosine fourth power law. This compensates for the attenuation of light by the focusing lens according to the cosine fourth power law and provides a uniform illumination level on the image plane.

BACKGROUND OF THE INVENTION

In the prior art, emphasis has been on illuminating the document plane uniformly. It was believed that by uniform illumination of the document plane the image plane would be substantially uniformly illuminated and a uniform copy would be the result when a photoconductor was exposed, developed, transferred and fused onto a paper carrier.

To accomplish the uniformity desired very high intensity lights have been used, thereby reducing the variance between the illumination level at different points on the document plane.

When the document plane is uniformly illuminated, as in the prior art, the illumination or light intensity distribution on the image plane at the photoconductive surface is not uniform. The light intensity decreases as the distance from the center of the image increases. It has been determined that the light intensity distribution varies in accordance with the cosine fourth power law. This law establishes that the illumination of a point on the image plane varies directly with the illumination of the object plane and the fourth power of the cosine of the angle between the lens axis and the chief ray from the document area, or $$E_\text{I} = KE_\text{o} \cos^4 \theta = \frac{KE' \cos^4 \theta}{\cos^4 \theta} = KE'$$

(a constant) where:
$E_\text{I}$ = the illumination of image plane;
$E_\text{o}$ = illumination of the document plane (a constant);
$E'$ = illumination at the center of the document plane;
$K$ = attenuation factor of the focusing lens (a constant);
$\theta$ = angle between lens axis and chief ray.

The cosine fourth power law as noted above provides basis for the conclusion that the illumination on the image plane for a uniformly illuminated document plane will be the most intense at the center and the least intense at the periphery.

In high speed photo copiers, there is a need for high light intensity and uniform exposure of the photoconductive material in order to secure uniform and high quality copies. The need for uniform light intensity at the image plane is further dictated because of the small amount of light reaching the photoconductor in comparison to the amount of light impinged upon the document plane. This high reduction of light is due to the absorbence of the diffused light rays which are not directed toward the focusing lens and are absorbed by the nonreflective surfaces of the interior of the copying machine. Secondly, uniformity of illumination of the image plane is required because the image is exposed completely at one time and not in a scanning line exposure method as is used in some prior art copiers. Since the exposure is accomplished for the entire document plane, and hence the image plane is exposed at the same time, any variations in light intensity from one area to the other will be carried from the document plane to the image plane taking into consideration the attenuation factor of the lens as it is expressed by the cosine fourth power law.

Flash exposure or simultaneous exposure of the entire image plane is dictated by the extremely high speed of the copier because there is insufficient time for all the mechanical linkages necessary for sequential scanning to reposition themselves properly before the next scanning sequence, and also because the inertia of all the mechanical parts must be overcome in a mechanical scanning operation.

Some attempts to compensate for the effects described by the cosine fourth power law have been made using curved reflective surfaces. The curved reflective surface has one serious drawback in that if there is a surface imperfection in the forming of the reflective surface, this imperfection will cause either a hot spot or a cold spot, and if the imperfection runs throughout the curved surface it will cause a hot or cold line thereby affecting the quality of the ultimate copy.

OBJECTS OF THE INVENTION

A primary object of this invention is to uniformly illuminate the image plane of a document copying machine.

A second object of this invention is to improve the light level of the document plane.

An important object of this invention is to compensate for variations in light intensity that occur during light transmission from an original document plane to an image plane.

Another object of the invention is to compensate for varations of light intensity that occur due to the attenuation of light passing through a focusing lens.

Still another object of the invention is to illuminate an object plane of a document copying machine so as to counteract and offset the light attenuation inherent in focusing lenses which corresponds to the cosine fourth power law.

The foregoing and other objects and advantages of the invention will become apparent from the following more particular description of the preferred embodiment of the invention as illustrated in the accompanying drawings.

SUMMARY OF THE INVENTION

In order to accomplish the above objects, plane mirrors are placed in a particular fixed relationship to flash tubes. The intensity of the light emanating from the flash tubes is directed toward the outer portions of the image plane and thereby approximately compensate for the attenuation of the focusing lens. Two mirrors are placed parallel to the axis of the flash tube with their reflective surfaces intersecting to form an acute angle. The flash tube axis coincides with the bisector of the acute angle so formed. By selecting the appropriate acute angle the number of images of the flash tube viewed from any point on the document plane, can be controlled. Further a third mirror is positioned parallel to the axis of the flash tube and intersecting with the plane of the second mirror thereby multiplying the number of images visible in the first two mirrors by two. By controlling the distance from the flash tubes and hence the images of the flash tubes to the document plane and by controlling the number of images observed from any point on the document plane, the light intensity at selected points on the document plane may be controlled and thus approximate the inverse of the cosine fourth power law.

DESCRIPTION OF THE INVENTION

Figure 2:
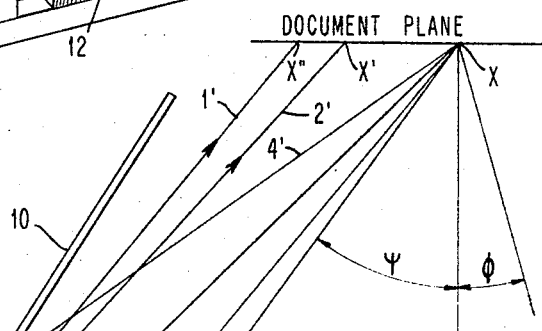
FIG. 2 is an end view of one flash tube together with its reflective mirrors showing their angular relationship.
Figure 2:
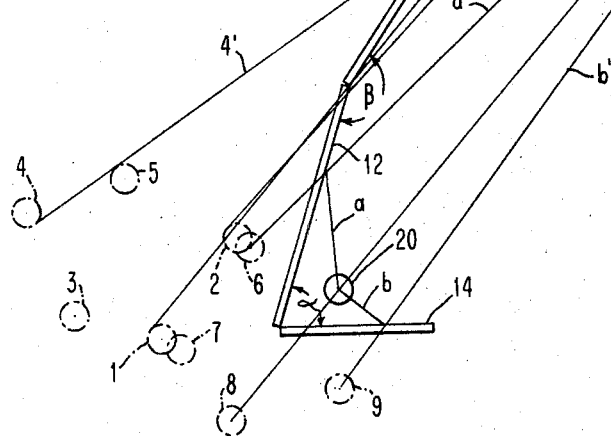

Referring to FIG. 2, to provide high intensity light for exposing a photoconductor in a copying machine, a flash tube 20 is provided. Flash tube 20 is turned on by impressing a voltage across its terminals. The tube will flash and remain illuminated as long as there is a voltage of the required magnitude impressed across its terminals. The duration of the flash is approximately 100 microseconds.

As is well known in the optical arts, the intensity of illumination is generally dependent upon the number of illuminating images and the distance from the illuminating images either real or apparent and the point being illuminated. To offset the effecets described as the cosine fourth power law, three mirrors or reflective surfaces are positioned around flash tube 20. For illustrative purposes in describing this invention the three reflective mirrors, 10, 12, 14 are first surface mirrors, meaning that the silvering on the mirror and the reflective surface is the first surface encountered by a light ray. This assumption eliminates any need to discuss indexes of refraction and the effects thereof. However, other types of mirrors such as polished plates or second surface mirrors may be used.

By observing the mirror arrangement from point X, any point on the document plane, it is apparent that there is one actual object, that being flash tube 20, and several apparent images appearing to surround the actual object 20. In describing this invention, actual object and flash tube are used interchangeably.

The number of images appearing to surround actual object 20 is dependent upon the angle $\alpha$ between reflective mirrors 14 and 12.

The angles $\alpha$ and $\beta$ are determined impericablly. First the desired light distribution of the document plane is determined, depending upon the attenuation factor (K) of the focusing lenses and the spacing of the lens and document plane, which dictates the range of the angle $\theta$ in the cosine fourth power law. Next the positioning of the flash tubes is fixed. Mirrors are placed around the flash tubes as in FIG. 1 and adjusted to form angles $\alpha$ and $\beta$. These angles are adjusted and varied until the desired light distribution is secured for a particular lens attenuation factor (K). The light distribution may be measured at points with a light meter and plotted to compare it with the desired distribution.

In the preferred embodiment shown in FIG. 2, mirrors 12 and 14 are arranged such that angle $\alpha$ is 74°. This particular arrangement yields an apparent image pattern of four images, 6, 7, 8, and 9 and actual object 20. As can be seen by moving the point X toward the right on the document plane image 8 will disappear behind actual object 20 thus reducing the number of images by one. As point X continues to move to the right, image 8 will reappear as an independent and distinct apparent image and if point X is moved far enough to the right image 7 will begin to disappear as image 7 and actual image 20 appear to coincide.

Further, as point X moves farther and farther to the right the distance from actual object 20 and apparent images 6, 7, 8, and 9 increases thereby reducing the amount of illumination or the illumination density for any incremental areas surrounding point X.

If point X is located close to the flash tube and the mirror arrangement of FIG. 2 on the document plane, it also receives rays reflected from mirror 10 which emanate either from mirror 12, mirror 14, or actual object 20. The angle $\beta$ between mirrors 10 and 12 has been determined to be approximately 163° for the preferred embodiment. Therefore mirror 10 has the effect of doubling the number of images and apparent images that are visible only in mirrors 12 and 14. In the preferred embodiment shown in FIG. 2, this has the effect of producing five additional images, 1, 2, 3, 4, and 5. These correspond to apparent images 7, 6, actual object 20, apparent images 8 and 9, respectively. As can be seen, the effect will be analogous to positioning 10 flash tubes in a pattern illustrated in FIG. 2.

The visibility of only the apparent images 6 and 9 are illustrated for sake of example. One skilled in the art will recognize that the remaining images are formed in an analogous manner. Ray $a$ emanates from actual object 20 and is reflected from reflective surface 12 along the path $a'$ to point X. Likewise ray $b$ impinges upon reflective surface 14 and is reflected along path $b'$ to point X. A similar analysis may be followed through for the two apparent images 7 and 8.

Although mirror 10 has the effect of duplicating in reverse the actual and apparent images 20, 6, 7, 8, and 9, it is understood that due to the discontinuity between mirrors 10 and 12 and 14 not all images will be visible at all point on the document plane. One can readily see the farther a point X is from the center of the document plane the center being toward the right in FIG. 2, the more images will be visible. Thus since the illumination at any point is the function of the number of images and the distance from the images to that point the farther left on the document plane point X is located, the higher the level of intensity of light. As point X is moved to the left in FIG. 2 to X' and then to X" the rays 1' and 2' illustrate further that some images will appear and disappear and further influences the light distribution on the document plane.

For the purpose of this specification and claims, a limitation angle is defined as the largest angle formed between the perpendicular to the document plane at any selected point and a light ray between that point and the edge of a fixed focusing lens positioned to receive light from the document plane.

The flash tubes 20 in FIG. 2 are positioned around the document plane so that all the images form angles of incidence $\psi$ greater than the limitation angle $\phi$ for any point of the document plane. This is necessary because the light must pass through the glass and impinge on a document. If the images form smaller angles of incidence $\psi$ than the limitation angle $\phi$ for any point on the document plane, light will be reflected from the under side of the glass to the photoconductor. With the images all forming larger angles of incidence $\psi$ than the limitation angle $\phi$ the light will pass through the glass to the document. If the light reflects from glass without passing to the document the effect will be that a washed out image will be projected onto the photoconductor. This will result in spotty and washed out copies of low quality.

If the angle of incidence $\psi$ is greater than the limitation angle $\phi$ any light reflected from the bottom surface will not pass from the glass to the lens and photoconductor but will be reflected outside the lens' field of view.

Figure 1:
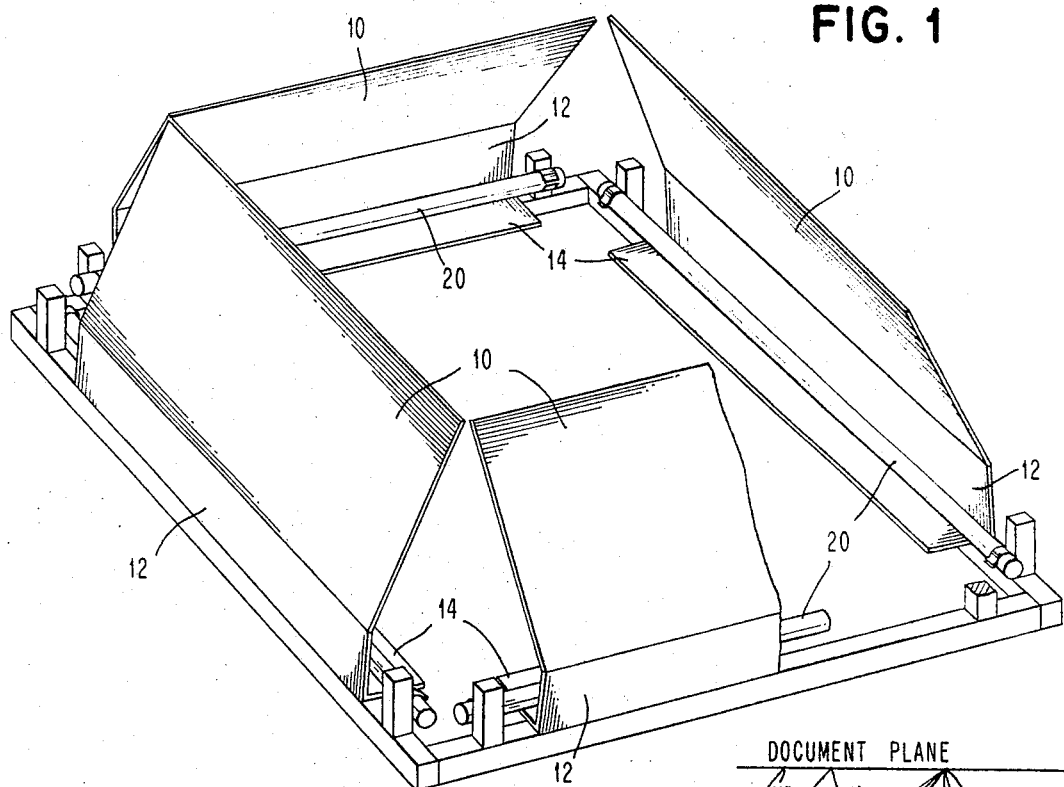
FIG. 1 is a perspective view of the illumination system showing the positions of the various mirrors.

The analyses discussed with respect to FIG. 2 may be applied to each side of the illumination apparatus in FIG. 1.

From FIG. 1 it can be more readily seen that when four flash tubes are positioned around a document plane and below the document plane and have associated with them a reflector arrangement as illustrated in FIG. 2 the effect of the side and end tubes 20, is additive in the corners of the document plane. It has been found that the effect of this arrangement is to provide a light distribution where equal light values are concentrically located around the document plane with the smallest light value being the center of the document plane and the largest light values being in the corners of the document plane. It has also been found that the light distribution experimentally produced substantially corresponds to the inverse of the cosine fourth power law or $E_o = E' \div \cos^4 \theta$ where $E'$=illumination at the center of the document plane. This means that the illumination on the image plane will be $$E_I = K E_O \cos^4 \theta = \frac{K E' \cos^4 \theta}{\cos^4 \theta} = K E'$$

(a constant).

Further it has been found that the light intensity on the document plane is increased by a factor of about 70% to 100% of that of conventional prior art reflector systems. The mirrors gather and reflect the rays upward to the document plane to accomplish this increase in intensity.

OPERATION OF THE INVENTION

To operate the invention the four flash tubes are flashed or fired simultaneously for a very short period of time, in the order of 100 microseconds. This light is reflected from all reflector sets as discussed earlier and then impinges upon the document to be illuminated. The illuminated document reflects light toward and through the focusing lens of the copier and then to the photoconductor. The light reaching the photoconductor has a substantially uniform distribution and exposes the photoconductor preparing it for further processing in the copying process.

One skilled in the art could then readily see that even though the outer portion of a document placed on the document plane is illuminated to a higher level of illumination than a point nearer the center, when the chief ray and other rays emanating from each of these points passes through a focusing lens and is focused on the image plane, the photoconductive material in an electrostatic copying apparatus, the level of light intensity on the image plane (photoconductor) will be essentially equal throughout the entire exposed area, for equal color and surface characteristics of the original.

Due to the substantially uniform exposure of the photoconductor improved quality copies and reliability of the photocopier is accomplished.

In the preferred embodiment of the invention as disclosed in FIG. 2, the angle $\alpha$ between reflective surfaces 12 and 14 is 74°. This angle may be varied slightly in either direction, i.e., about 5°, to compensate for a particular desired light distribution. Likewise angle $\beta$ between reflective surfaces 10 and 12 has been determined at 163° approximately. Again this angle may be varied slightly, i.e., about 5° to vary the light distribution should it be desirable. By varying the angle $\alpha$ substantially the number of images may be increased or decreased. A decrease in angle $\alpha$ to approximately 60° will yield six images, one actual object and five apparent images, while an increase in angle $\alpha$ to approximately 90° will result in a decrease of images to four, one actual object and three apparent images. By varying angle $\alpha$ and angle $\beta$ a light distribution different from that illustrated in this disclosure may be obtained if it is desirable for a particular use.

While the invention has been particularly shown and described with reference to a preferred embodiment, it will be understood by those skilled in the art that various changes in form and detail may be made without departing from the spirit and scope of the invention.

What is claimed is:

1. An illumination system for illuminating a document plane of a document copying machine having a focusing lens, in a nonuniform distribution of light to counteract the attenuation of the focusing lens comprising:
   a first pair of spaced apart parallel illuminating means spaced from said document plane;
   a second pair of spaced apart parallel illumination means positioned transverse to said first pair of illumination means, and spaced from said document plane, forming a generally rectangular array;
   a plurality of segmented plane reflector means for impinging the illumination from said illumination means on the document plane in an inverse relation to the attenuation of said focusing lens, said reflector means positioned with the axis of each of said segments of said reflector means parallel to the axis of each of said illumination means with the reflective surfaces of said reflection means directed toward the array formed by said pairs of illumination means.

2. An illumination system for illuminating a document plane of a document copying apparatus having a focusing lens, to compensate for the attenuating effects of the focusing lens comprising:
   a plurality of flash tubes positioned in the vicinity of the document plane, said plurality of flash tubes generally parallel to and spaced apart from said document plane, for providing illumination for said document plane;
   a plurality of segmented plane reflector means for directing and distributing illumination from said illumination means onto the document plane in an inverse relation to the attenuation of the illumination from said document plane by said focusing lens, said plurality of segmented plane reflector means comprising:
      a first plane reflector means with the reflective surface adjacent each of said illumination means and spaced oppositely from said document plane,
      a second plane reflection means with the reflective surface outwardly from said plurality of flash tubes and forming an acute angle with said first reflection means,
      a third plane reflector means with reflective surface between said illumination means and said document plane and oriented to reflect light striking it perpendicular to the reflective surface, downwardly toward said rectangular array and forming an obtuse angle with said second reflective means.

3. The illuminating system of claim 2 wherein the axes of said flash tubes lie in the bisector of said acute angles.

4. The illumination system of claim 2 wherein all images formed by said flash tubes and said reflective surfaces are positioned to form angles of incidence at all points on the document plane, said angles being larger than the limitation angle for said points.

5. The method of uniformly illuminating an image plane of a document copying machine having a focusing lens and a document plane, comprising the steps of:
   positioning flash tube means in an array and spaced apart from said document plane;
   positioning a plurality of plane reflection means around said flash tube means adjusting each of said reflection means relative to said flash tube means and other said plane reflection means to form angles between adjacent ones of said plane reflection means to distribute light to said document plane in a light distribution inverse to the attenuation effects of said focusing lens, in accordance with the cosine fourth power law;
   flashing said flash tube means to nonuniformly illuminate said document plane; and
   passing light emanating from said document plane through said focusing lens onto said image plane, whereby said image plane is uniformly illuminated and the attenuation effect of said lens are offset by the nonuniform lighting of said document plane.

References Cited

UNITED STATES PATENTS

| | | | |
|---|---|---|---|
| 767,571 | 8/1904 | Lande | 355—70 |
| 3,467,469 | 9/1969 | Hastings | 355—67 |
| 3,074,313 | 1/1963 | Young | 355—70 |
| 1,788,910 | 1/1931 | Buttolph | 240—41.1 |
| 3,381,125 | 4/1968 | Cooper | 240—41.35 X |
| 3,437,802 | 4/1969 | Intrator | 240—41.35 X |

FOREIGN PATENTS

| | | | |
|---|---|---|---|
| 954,581 | 6/1949 | France | 355—70 |
| 327,018 | 3/1930 | Great Britain | 355—70 |
| 602,177 | 3/1926 | France | 355—70 |

SAMUEL S. MATTHEWS, Primary Examiner

M. H. HAYES, Assistant Examiner

U.S. Cl. X.R.

240—41.1, 41.35; 355—70